US006799502B2

(12) United States Patent
Wolfsteiner et al.

(10) Patent No.: US 6,799,502 B2
(45) Date of Patent: Oct. 5, 2004

(54) SPRING BRAKE CYLINDER WITH AN EMERGENCY RELEASE DEVICE

(75) Inventors: Peter Wolfsteiner, Munich (DE); Josef Staltmeir, Munich (DE); Thomas Spiess, Munich (DE); Erich Fuderer, Munich (DE)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 12 days.

(21) Appl. No.: 10/258,530

(22) PCT Filed: Mar. 28, 2001

(86) PCT No.: PCT/EP01/03518

§ 371 (c)(1),
(2), (4) Date: Mar. 6, 2003

(87) PCT Pub. No.: WO01/81144

PCT Pub. Date: Nov. 1, 2001

(65) Prior Publication Data

US 2003/0154854 A1 Aug. 21, 2003

(30) Foreign Application Priority Data

Apr. 26, 2000 (DE) .......................................... 100 20 350

(51) Int. Cl.[7] .................................................. F01B 9/00
(52) U.S. Cl. ................................................ 92/29; 92/63
(58) Field of Search .............................. 92/14, 29, 63, 92/136

(56) References Cited

U.S. PATENT DOCUMENTS

| 4,063,491 A | | 12/1977 | Roger et al. ................... 92/63 |
| 4,080,875 A | * | 3/1978 | Repolovsky et al. .......... 92/29 |
| 4,226,168 A | | 10/1980 | Staltmeir et al. ............. 92/116 |

FOREIGN PATENT DOCUMENTS

| DE | 26 08 502 C3 | 9/1976 |
| DE | 27 48 540 C2 | 10/1977 |
| DE | 36 24 475 A1 | 1/1988 |
| DE | 196 30 795 A1 | 2/1998 |

* cited by examiner

Primary Examiner—F. Daniel Lopez
(74) Attorney, Agent, or Firm—Barnes & Thornburg LLP

(57) ABSTRACT

The invention relates to a spring brake cylinder with an emergency release device, comprising the following: a housing in which a spring-loaded piston can be moved axially with a piston rod, at least one spring-loaded spring, wherein the emergency release device comprises an actuation device, an emergency release mechanism to interrupt the power transmission between the spring-loaded piston and the piston rod and a holding device for holding the emergency release device in a transmission condition. The invention further includes a blocking device to prevent the holding device from holding of the emergency release mechanism in a transmission position when the spring-loaded piston only partly released

20 Claims, 10 Drawing Sheets

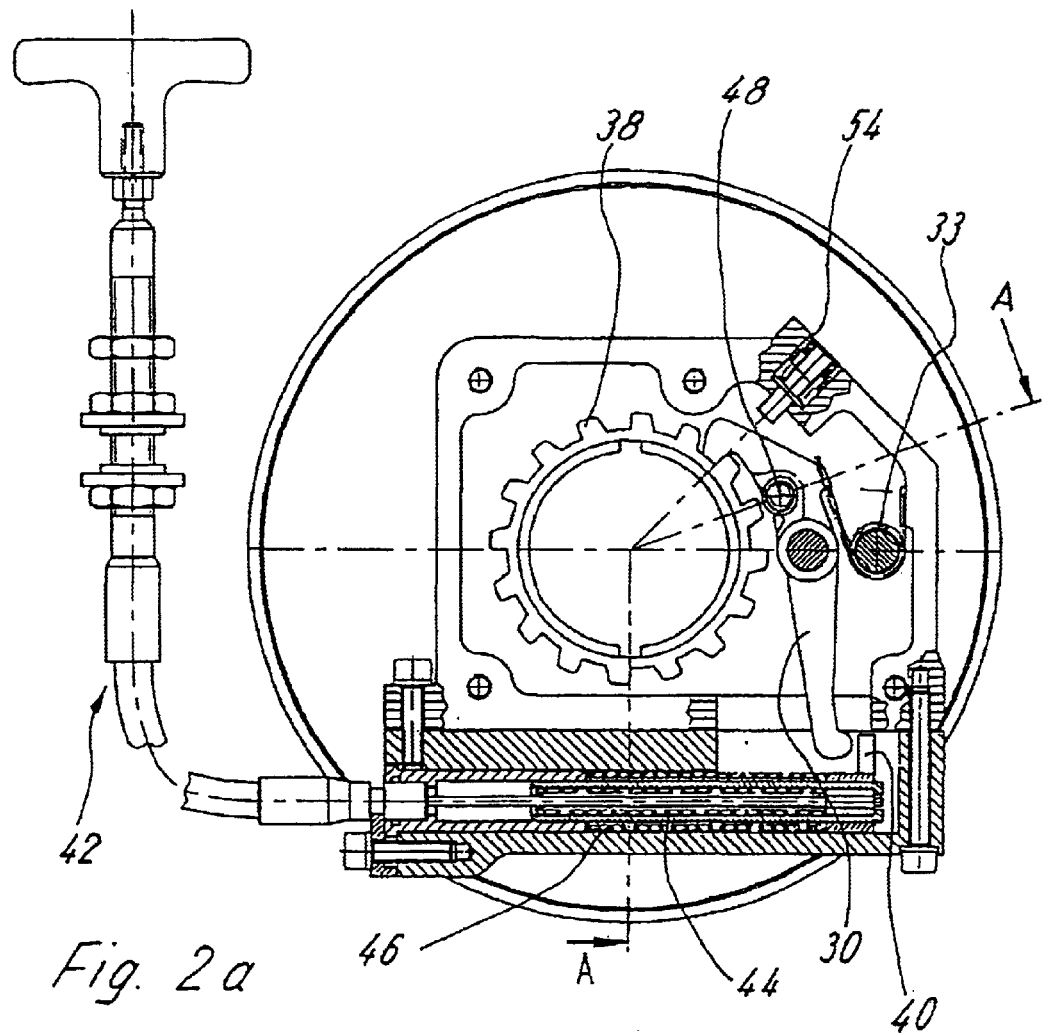
Fig. 2a
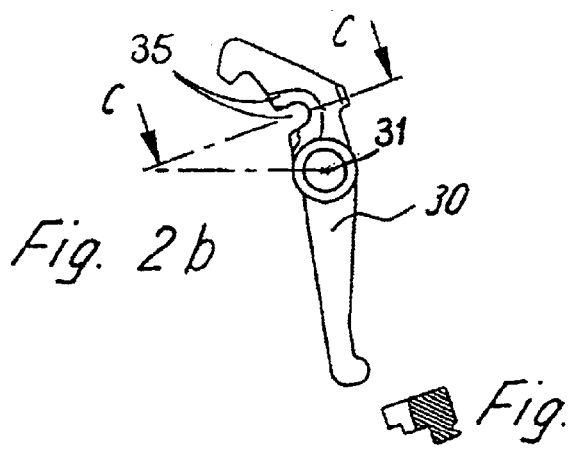
Fig. 2b
Fig. 2c

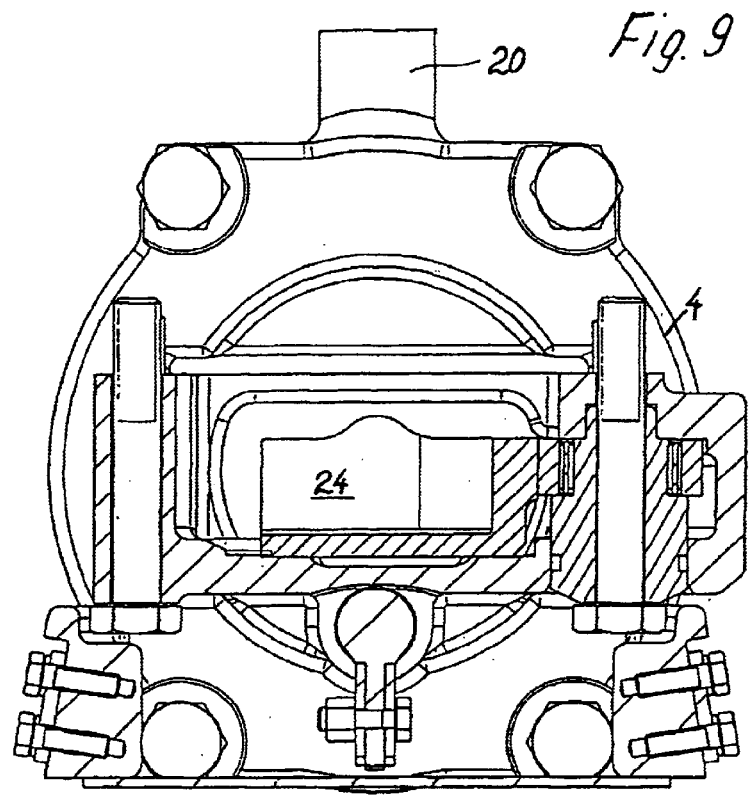
Fig. 9
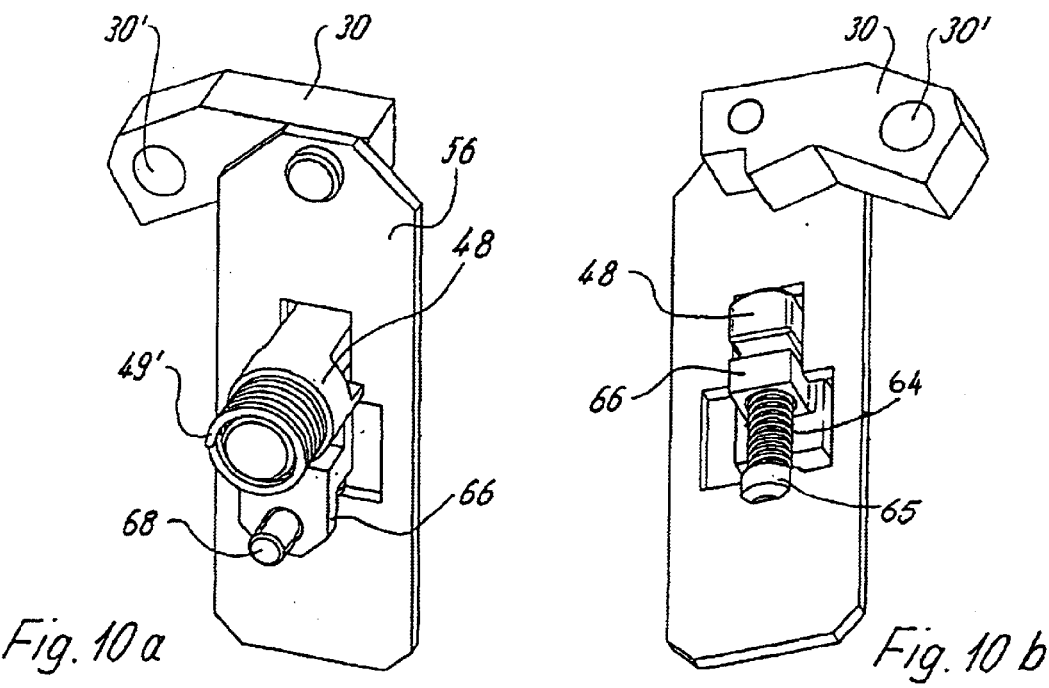
Fig. 10a
Fig. 10b

US 6,799,502 B2

SPRING BRAKE CYLINDER WITH AN EMERGENCY RELEASE DEVICE

BACKGROUND AND SUMMARY OF THE INVENTION

The invention relates to a pneumatically, hydraulically or electromechanically operated spring brake cylinder with an emergency release device. The brake cylinder includes a housing, in which a spring-loaded piston is axially displaceable by a piston rod, at least one spring-loaded spring, and, in the case of pneumatic or hydraulic operation, a pressure connection for admitting pressure fluid to the spring-loaded piston. The emergency release device includes an operating device and an emergency release mechanism for interrupting the transmission of force between the spring-loaded piston and the piston rod with a holding device for holding the emergency release device in a transmission condition.

From German Patent Documents DE PS 26 08 502, corresponding to U.S. Pat. No. 4,063,491, and DE PS 27 48 540, corresponding to U.S. Pat. No. 4,226,168, brake cylinders are known with emergency release devices for the interruption and the automatic return of the braking function of a spring-loaded cylinder, in which case, the emergency release lever for the emergency release must be operated or held until the accumulated spring force is completely reduced.

Although these solutions have been successful per se, when the operating or emergency release lever is not operated or held sufficiently long, at extremely low temperatures, conditions of the spring accumulator are conceivable which result only in a partial force reduction. Because of the viscosity of the lubricants, which increases with the falling temperature, the time period until the force is completely reduced is lengthened in comparison to higher temperatures. During this time period, the emergency release lever would therefore have to remain operated or held in order to completely reduce the accumulated spring force.

Here, the invention uses a different approach. The invention starts with the recognition of the present problems and, in view of these problems, has the object of further developing the spring brake cylinder of the above-mentioned type such that situations are reliably avoided in which only a partial reduction or build-up of force takes place.

The invention solves this task. The holding device for holding the emergency release device at different holding positions is supplemented by a blocking device for preventing the holding of the holding device when the spring-loaded piston is only partially released. This prevents a holding, particularly an engaging of the emergency release operation when the spring accumulator is only partially released. Thus, for the emergency release of the spring accumulator, a one-time brief operation of the emergency release lever will be sufficient because the premature engaging of the blocking mechanism is reliably prevented by the blocking device.

According to one embodiment of the invention, the blocking device comprises a locking bar which locks the emergency release mechanism of the spring accumulator in the released position until the spring accumulator is completely released or is operative again.

In a cost-effective constructively simple further development, the holding device has a detent pawl acting upon a gear wheel. However, it is also conceivable that the holding device is designed to be rotating and/or linear and/or locking and/or clamping and permits several holding positions. A spring in the transmission of force of the operation of the emergency release device in a simple manner prevents intermediate conditions of the detent pawl.

According to various embodiments of the invention, particularly the following locking bar arrangements are useful:

between the spring-loaded housing and the spring-loaded piston, or between the piston rod and the spring-loaded piston, or between the piston rod and the spring-loaded housing.

Additional advantageous further developments of the invention are contained herein.

In the following, essentially two different basic embodiments of the invention and the blocking devices implemented within the scope of the invention will be described in detail with reference to the drawings.

BRIEF DESCRIPTION OF THE DRAWINGS

FIG. 2a is a cross-sectional view of a brake cylinder, according to the present invention, taken along lines BB of FIG. 1.

FIG. 2b is a side view of a detent pawl of FIG. 2a.

FIG. 2c is a cross-sectional view of the detent pawl taken along lines CC of FIG. 2b.

FIG. 8a shows a cross-sectional view of a third embodiment of a brake cylinder with emergency release device incorporating the principles of the present invention.

FIG. 8b shows an enlarged portion of FIG. 8a.

FIG. 9 is an end view of the embodiment of FIG. 8.

FIGS. 10a and 10b are perspective views of the third embodiment of the emergency release device.

DETAILED DESCRIPTION OF THE PREFERRED EMBODIMENTS

First, by means of an example of embodiment one with reference to FIGS. 1 and 2, the function of the spring accumulator of the first embodiment of the invention will be described.

Figure 1:
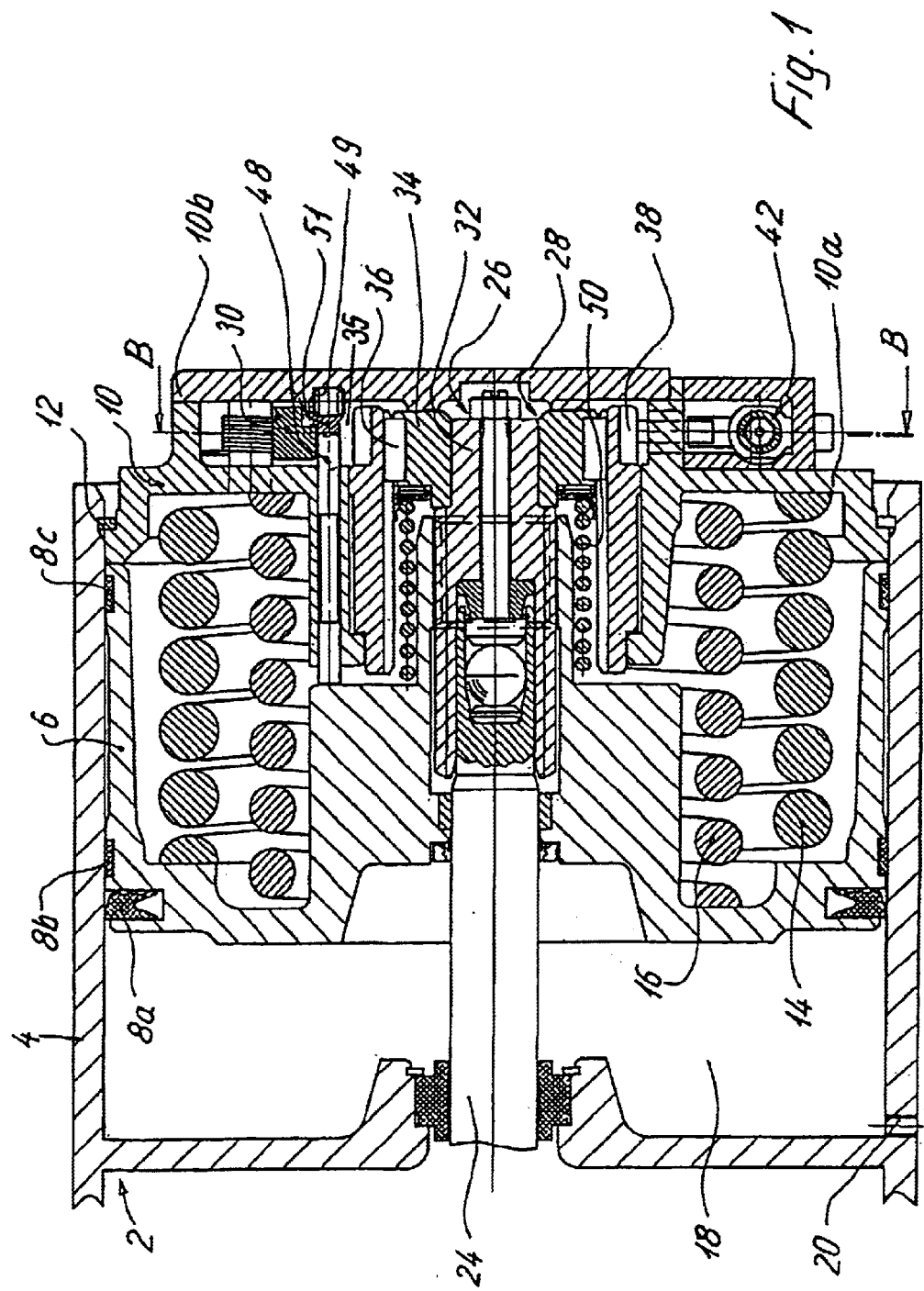
FIG. 1 is a cross-sectional view of a brake cylinder, according to the present invention, taken along lines AA of FIG. 2.

FIGS. 1 and 2 show two different views of a spring-loaded cylinder 2 having a housing 4 in which a spring-loaded piston 6 is arranged in an axially displaceable manner and on whose outer circumference sealing devices and sliding bands 8a–8c are distributed. The spring-loaded springs 14, 16 are arranged between the spring-loaded piston 6 and an axial housing cover 10 which is fastened on the inner circumference of the housing 4 by a snap ring 12.

Between the spring-loaded piston 6 and the housing 4, a pressure space 18 is constructed which can be acted upon by pressure by an air connection 20 in the circumference of the housing 4. The spring brake can be released and applied by the venting and bleeding by way of the air connection 20. When the spring accumulator 4 is not in the emergency released operating condition, the force of the spring-loaded springs 14, 16 is supported by way of the spring-loaded piston 6 and either the pressure in the pressure space or volume 18 or a piston rod 24 on the spring loaded piston 6 on the braking device which is otherwise not shown here.

For releasing the engaged spring brake also without compressed air, the spring-loaded cylinder 6 has an emergency release device 26 which permits an interruption of the transmission of force between the spring-loaded piston 6 and the piston rod 24.

In the illustrated example, the emergency release device 26 or the emergency release mechanism portion of 26 is essentially based on the function of a spindle arrangement 28 with a detent pawl 30 which is swivellably disposed between two mutually axially offset sections 10a and 10b of the housing cover 10. A threaded spindle 32 of the spindle arrangement transmits force between the spring-loaded piston 6 and the piston rod 24. The resulting torque of the spindle arrangement is transmitted in the blocked or transmission condition by a displaceable guide 34 having an adjusting spring 36 to a gear wheel 38, which can be blocked or released by the detent pawl 30 (see particularly also FIGS. 2 and 5). For this purpose, one end of the detent pawl 30 engages in the gear wheel 38 in one of the operating positions of the emergency release device. In contrast, the other end of the detent pawl 30 can be lifted out of the toothing of the gear wheel 38 by an emergency operating unit with a Bowden cable 42 and a restoring spring 44 constructed at the Bowden cable and a pressure spring 46. The rotation of the gear wheel 38 is released in this position of the detent pawl 30. As a result, the transmission of force between the spring-loaded piston 6 and the piston rod 24 can be interrupted. The detent pawl 30 can be swivelled about an axis 31. A catch spring 33 presses one end of the detent pawl 30 in the direction of the toothing of the gear wheel 38.

When the emergency release device is operated when a braking or spring force is applied to the piston rod 24, a rotation of the threaded spindle 32 will be caused when the braking force is reduced so that the spring-loaded piston 6 impacts on the housing 4. In order to prevent another locking of the detent pawl 30 during the release operation, a locking bar 48 is arranged on the interior surface of section 10b of the spring accumulator cover or housing cover 10, which locking bar 48 holds back the lifted-out detent pawl 30.

The locking bar 48 essentially has a bolt-type shape and, on its end facing the housing cover section 10b, is equipped with a locking head 51. Between the two-part housing cover 10a, 10b (which has an indentation in this area) and the locking head 51 (with an axial recess), a locking spring 49 is arranged which presses the locking bar 48 in the direction of the detent pawl 30. In one of the operating positions, the locking head 51 engages in a lateral stepped recess 35 of the detent pawl 30 for receiving the locking bolt 48 and locks the detent pawl 30 in its release position (see FIG. 5b). The section of the locking bar 48 facing away from the locking head 51 has a bolt-type construction penetrating the interior housing cover section 10a. When the spring-loaded piston 6 is displaced in the direction of the housing cover 10, it compresses the locking bar spring 49 and presses the locking head 51 of locking bar 48 out of its engaged position in the detent pawl 30 (FIGS. 1 and 2). Thus, only when the spring-loaded piston 6, after a release operation, is again in the operative position, will the locking bar 48 release the detent pawl again for an engagement.

Figure 5A:
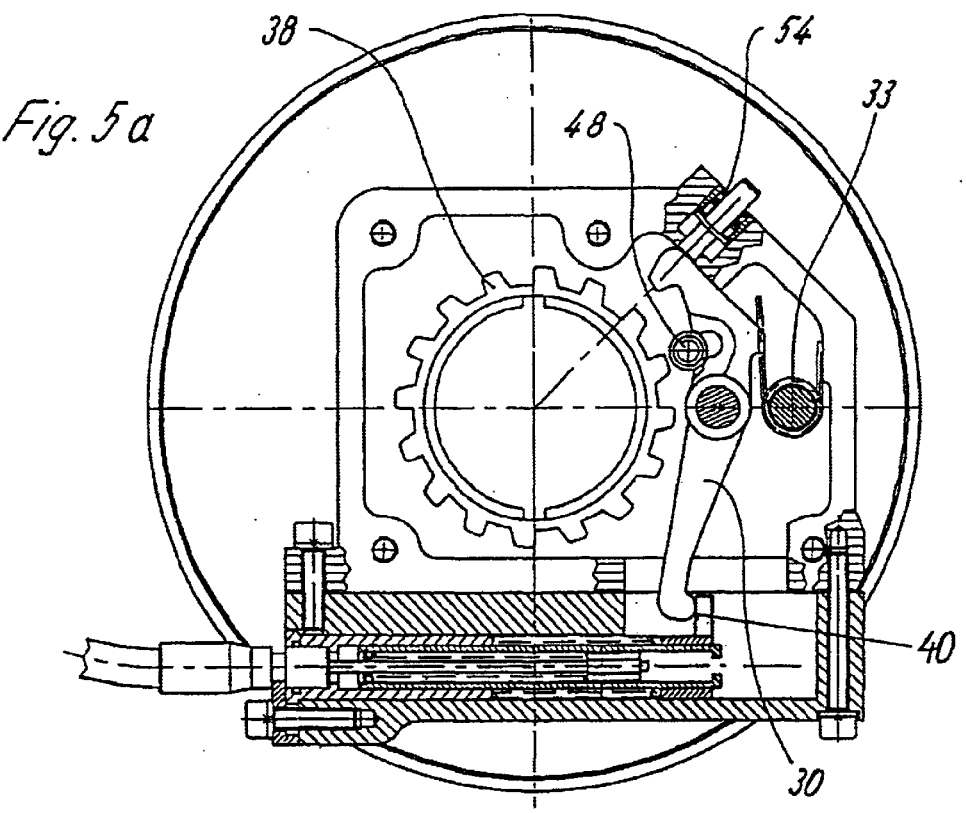
FIGS. 5a and 5b show emergency release operation and detent pawl locked.
Figure 5B:
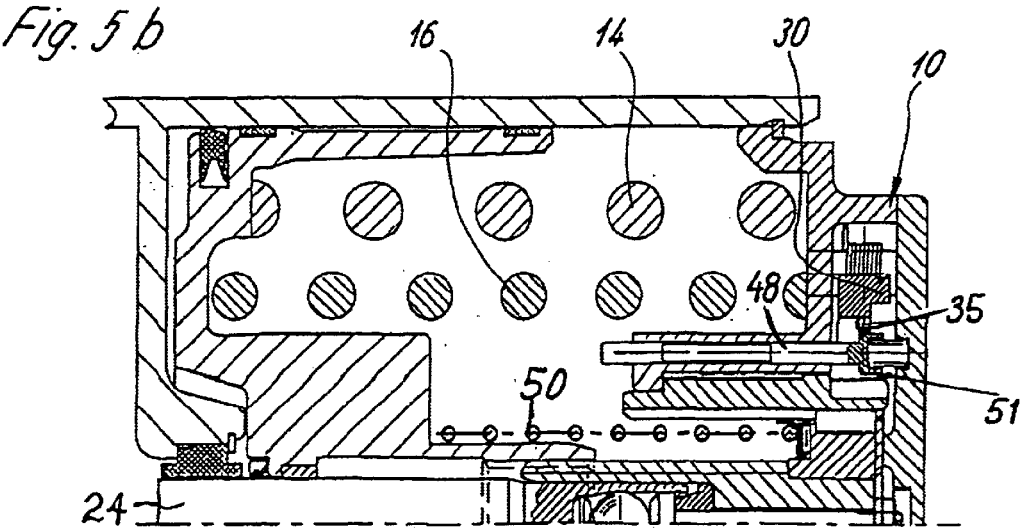
Figure 6A:
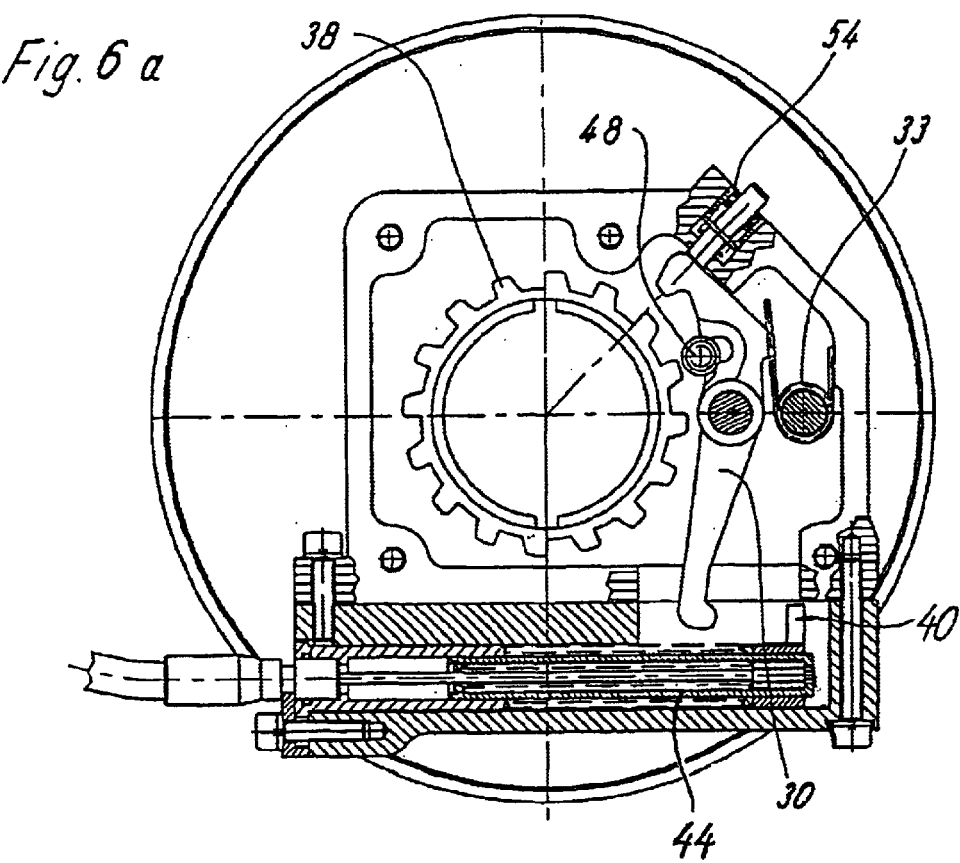
FIGS. 6a and 6b show the spring actuator emergency-released and the emergency release operation withdrawn.

The optional display device 54 illustrated in FIG. 2 shows the "emergency-released" condition of the spring-loaded cylinder 2, in which the display device 54 is contacted by the detent pawl 30, as shown in FIGS. 5 and 6a.

Essentially, the following different positions of the spring accumulator are obtained before and after an emergency release operation: (Sequence: Operative—emergency releasing—operative)

1. Spring-Loaded Cylinder 2 Released by Pressure (FIG. 3):

The spring-loaded cylinder 2 is released by the pressure in the pressure volume 18, and the spring-loaded piston is displaced in the direction of the housing cover 10. No braking force is applied to the piston rod 24, and the detent pawl 30 and the gear wheel 38 are in the locked condition.

Figure 4A:
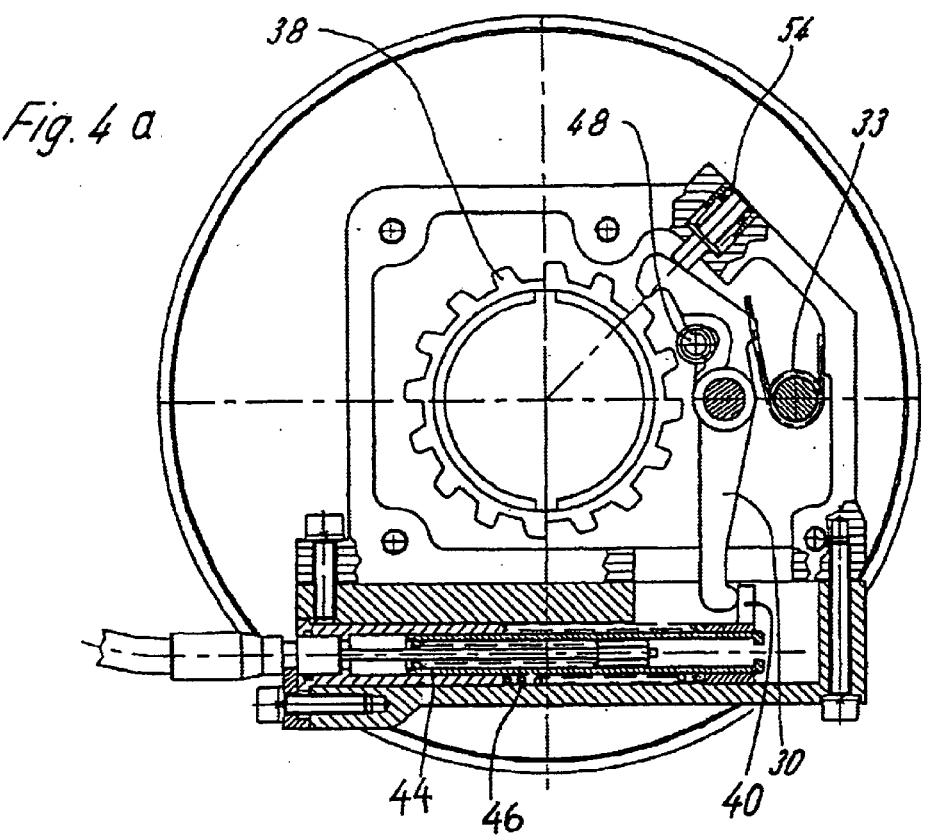
FIGS. 4a and 4b show the spring actuator in the braking position and start of the emergency release operation.
Figure 4B:
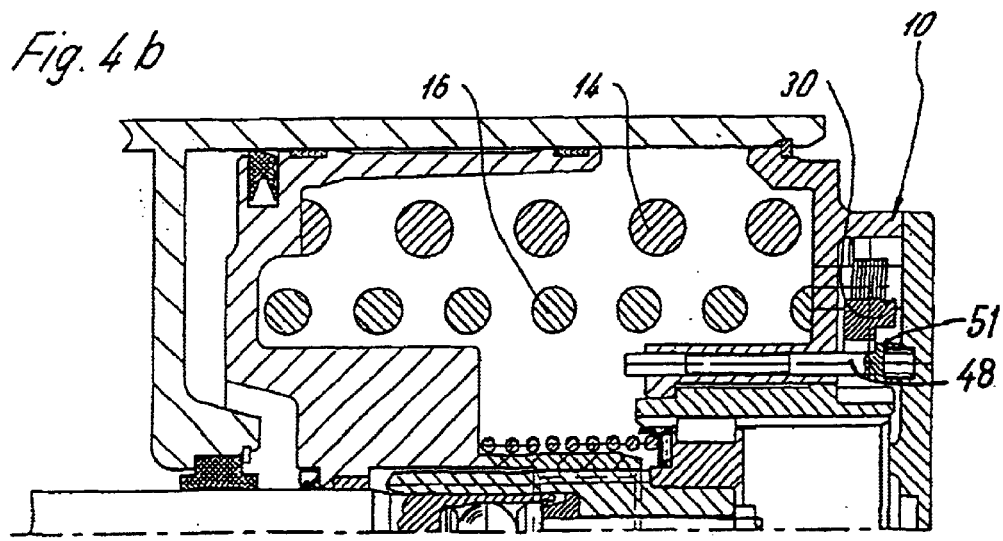

2. Spring-Accumulator in the Braking Position, Start of the Emergence Release Operation (FIG. 4):

The spring-loaded cylinder 2 is in its braking position. The pressure volume or the pressure space 18 is without pressure. The force of the spring-loaded springs 14, 16 is applied to the piston rod 24.

The emergency release operation is initiated by a pulling on the emergency release operation device. By way of the pressure spring 46 and the driving device 40, the detent pawl 30 is lifted out of the toothing of the gear wheel 38.

3. Emergency Release Operation, Detent Pawl 30 Locked (FIG. 5):

The spring-loaded springs 14, 16 are supported by the spring-loaded piston 6 on the spring-loaded housing cover 10. The piston rod 24 is free of force, and it was moved into its starting position by the back pressure spring 50.

By means of the engaged locking head 51 of locking bar 48, the detent pawl 30 is held in its release position, and the display device 54 is active.

Figure 6B:
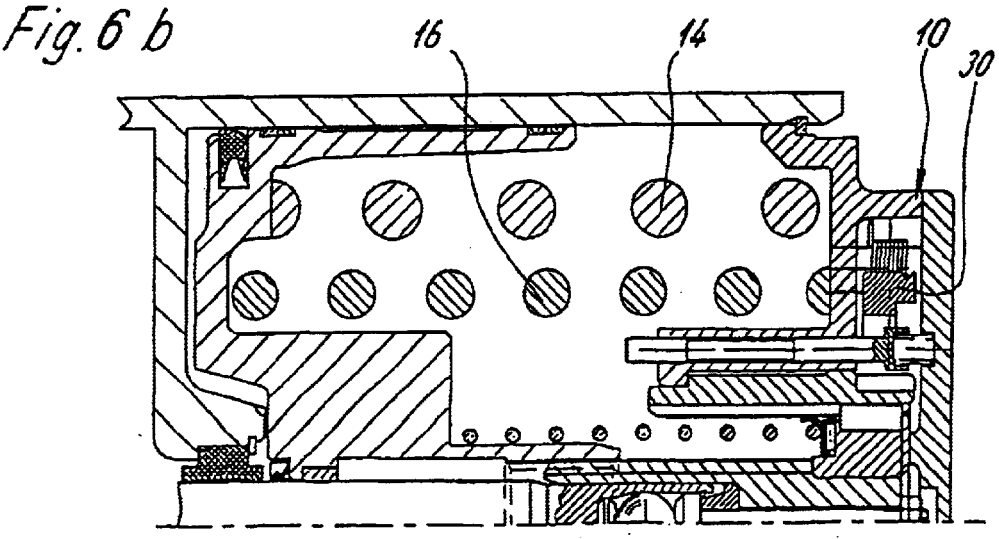

4. Spring Accumulator Emergency-Released, Emergency Release Operation Withdrawn (FIG. 6):

The spring-loaded cylinder is in the "emergency-released" condition, and the detent pawl 30 is locked. The emergency release operation device or driver 40 was moved into the starting position by the restoring spring 44.

Figure 3A:
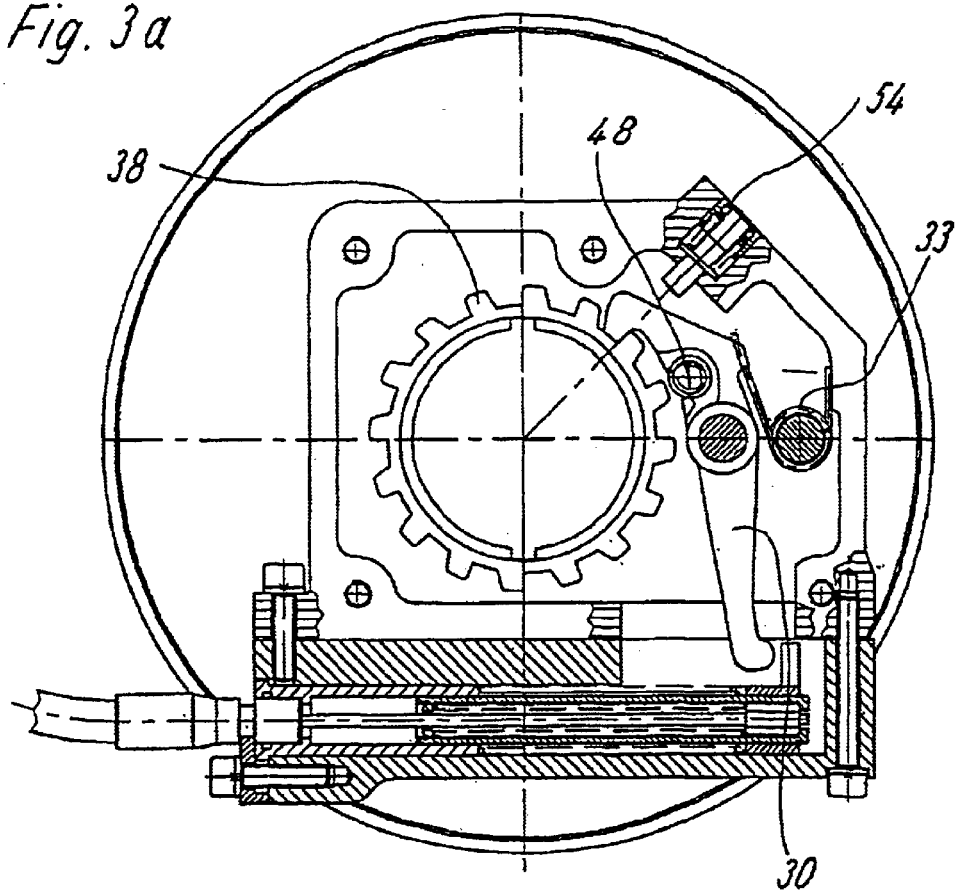
FIGS. 3a and 3b show the spring-loaded cylinder released by pressure.
Figure 3B:
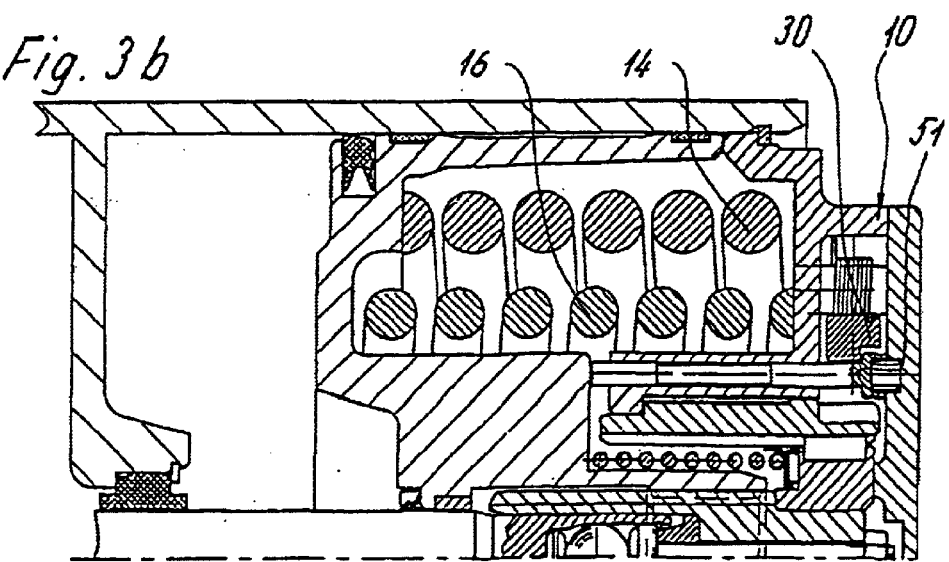

5. Spring Accumulator Which Is Operative Again (FIG. 3):

The applying of pressure into the pressure volume 18 leads to the restoration of the readiness condition of the spring accumulator 2. The locking bar 48 holds the detent pawl 30 in the released condition until the spring-loaded springs 14, 16 again have their prestress and the spring-loaded piston 6 takes up its right end position, as illustrated in FIG. 3. The piston 6 moves the locking bar 48 to the right and the locking head 51 out of engagement with the detent pawl 30. After the engagement of the detent pawl 30 and gear wheel 38, the tensional connection between the spring-loaded piston 6 and the piston rod 24 is restored.

In order to ensure the engaging of the locking bar 31 in the detent pawl 30 during an operation of the emergency release device, the pressure spring 46 is provided in the transmission of force between the emergency release device and the driving device 40. The prestressing of the pressure spring 46 ensures the swivelling movement of the pawl 30 from the initial travel of unlocking of the gear wheel 38 to the further travel to the locking by the locking bar 48.

Figure 7:
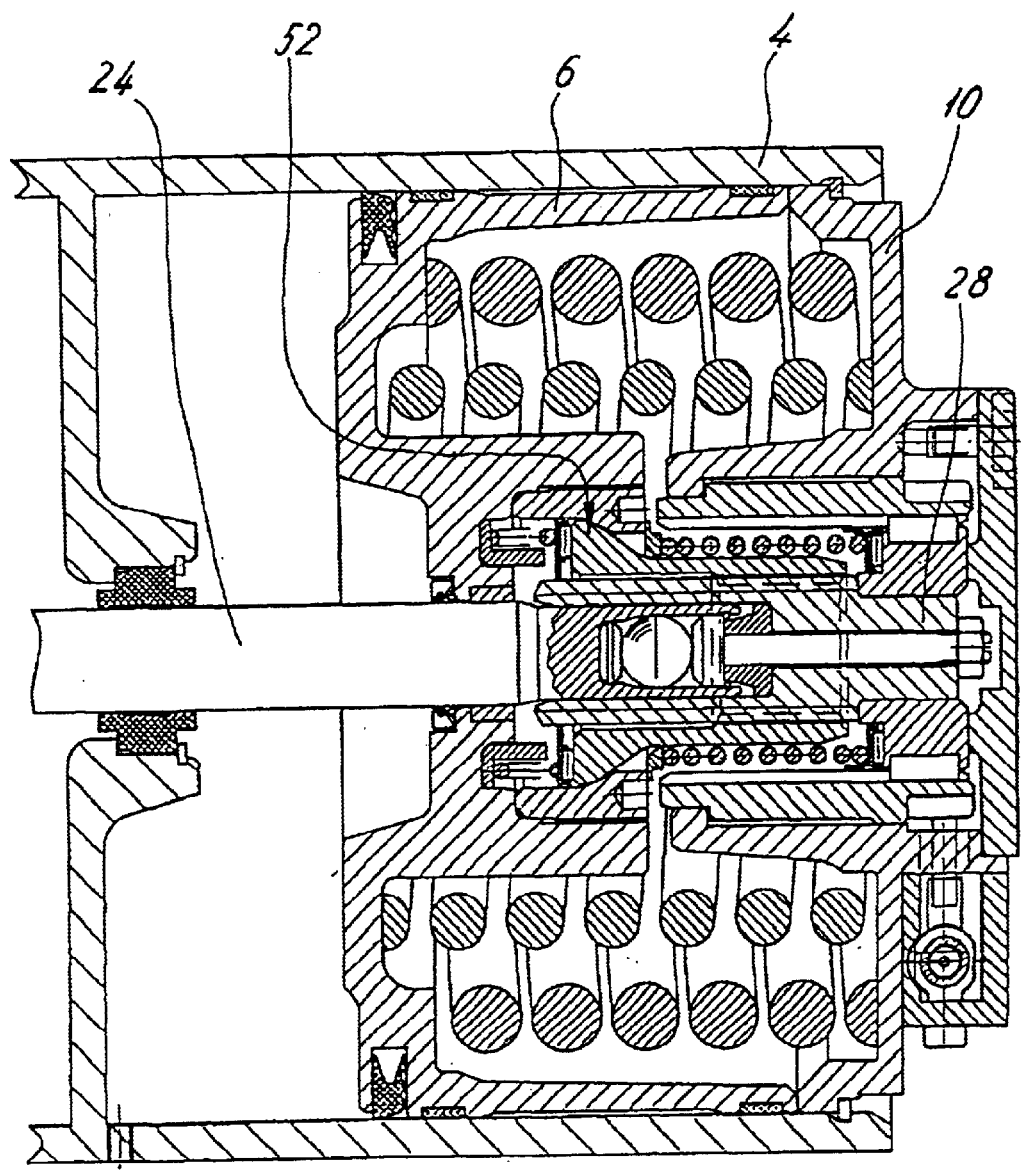
FIG. 7 shows a second embodiment of a brake cylinder with an emergency release device, according to the present invention, similar to that of FIG. 1.

FIG. 7 shows a modification of the embodiment of FIGS. 1 to 6. In this embodiment, a free running device of the gear wheel 38, here, a cone clutch 52, is constructed in the transmission of force between the spring-loaded piston 6 and the piston rod 24. The cone clutch 52 permits a reduction of the shock occurring during the emergency release operation because it ensures an unhindered continued running of the gear wheel 38 and of the threaded spindle 32 after the emergency release operation.

In the first embodiment of FIGS. 1 to 6 and the modification of this embodiment according to FIG. 7, the detent pawl 30 and its locking device 48 are situated in the springloaded or housing cover 10 which is fixedly connected with the spring-loaded housing 4. The locking bar 48 is operated by the spring-loaded piston. The pawl 30 itself is arranged between two sections 10a and 10b of the housing cover 10 which can be assembled.

Figure 8:
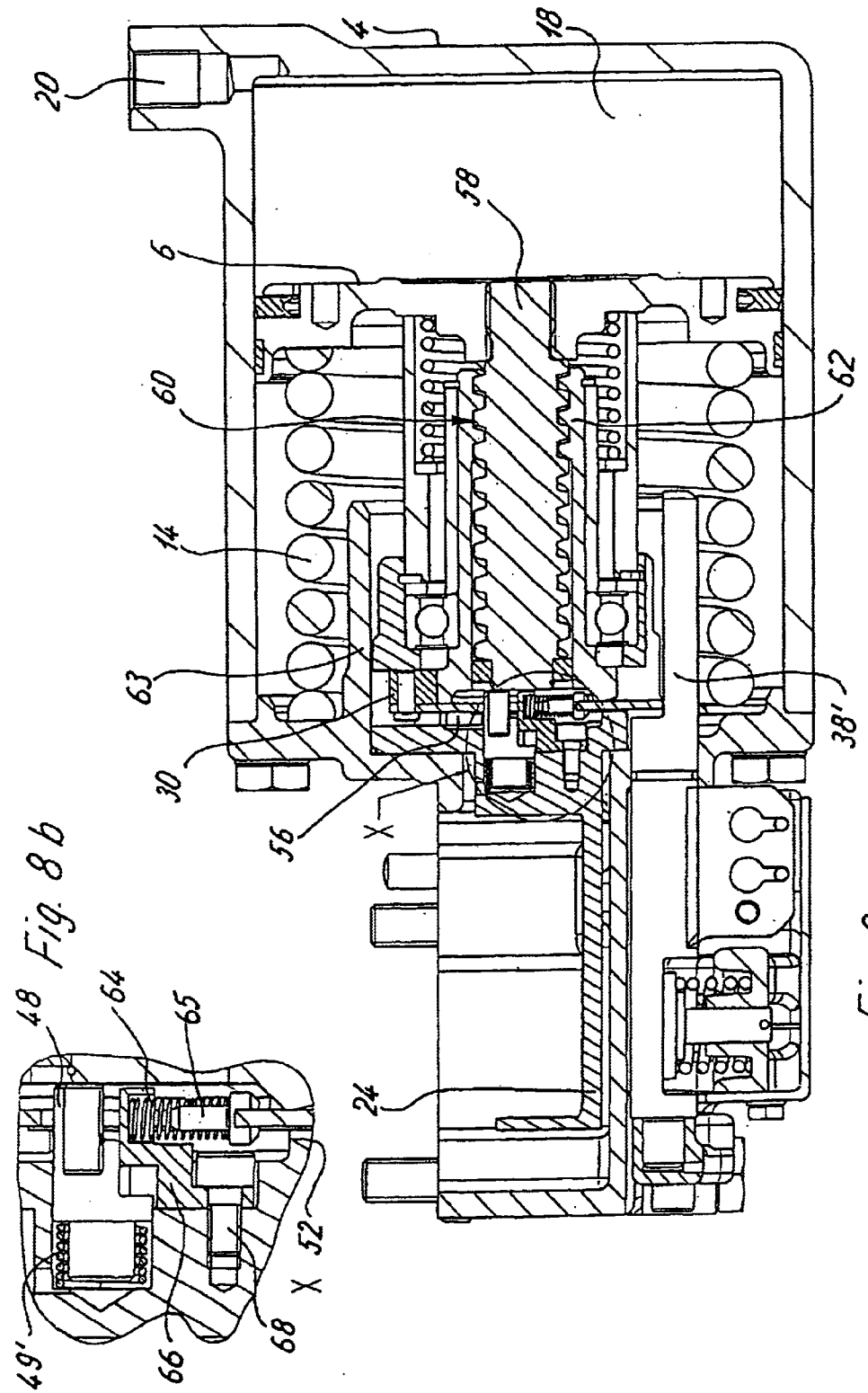

The embodiment of FIGS. 8, 9 and 10 basically differs from the embodiment of FIG. 1 as a result of the arrangement of the detent pawl 30 and of the locking bar 48. The detent pawl 30 and the pertaining locking bar 48 are arranged on the piston rod 24. The locking bar 48 is moved by the threaded spindle 58 which is rotatable relative to the springloaded piston 24.

The second embodiment of FIGS. 8, 9 and 10 therefore shows another possibility of the locking bar arrangement. In this embodiment, the detent pawl 30 is rotatably arranged on the piston rod 34 by a bolt (in this regard, see the bore 30' in the pawl 30; see FIGS. 10a, 10b) and is operated by the spring-loaded piston 6. In this embodiment, the spring-loaded piston 6 and the spring-loaded spring 14 are arranged such that the pressure space 18 is situated on the right-hand side of the spring-loaded piston 6 in the drawing. The spring-loaded piston 6 is disposed on the threaded spindle 58 which, at one of its ends, if fixedly screwed to the spring-loaded piston 6. In its area facing away from the piston 6, the spindle 58 is provided with a type of trapezoidal thread. In the area of the trapezoidal thread, the threaded spindle 58 is screwed into a sleeve 62 provided with a corresponding internal thread. The sleeve 62 is provided with an external toothing at its end facing away from the springloaded piston 6, so that the gear wheel 38' is constructed in this area of the sleeve 62. In one of its operating positions, the detent pawl 30, which is arranged on an end area of the axially and radially displaceable holding plate 56, engages in the gear wheel 38' and blocks it. An operation of the emergency release device displaces the plate 56 radially and releases the pawl 30 from the gear wheel 38' and thereby interrupts the transmission of force between the spring-loaded piston 6 and the piston rod 24. In this case, the locking bar 48—pushed forward by the locking bar spring 49'—engages in an opening of the holding plate 56 and locks it radially. The locking bar 48 is moved and released by the spindle 58 fixedly connected with the spring-loaded piston 6.

In this embodiment of the invention, the locking bar 48 is therefore arranged between the piston rod 24 and the spring-loaded piston 6. The locking bar spring 49' is disposed between the piston rod 24 and the spring-loaded piston 6. The holding plate 56 is radially displaceable in an interior cylindrical attachment 63 of the brake cylinder housing and moves axially with the piston rod 24 and the spring-loaded piston 6. The radial displacement of the plate 56 takes place by a coil spring 64 which is supported on a bolt 65 in the holding plate 56 and on a holding part 66 which, in an immobile manner, is screwed to the piston rod 24 by a bolt 68.

Figure 11:
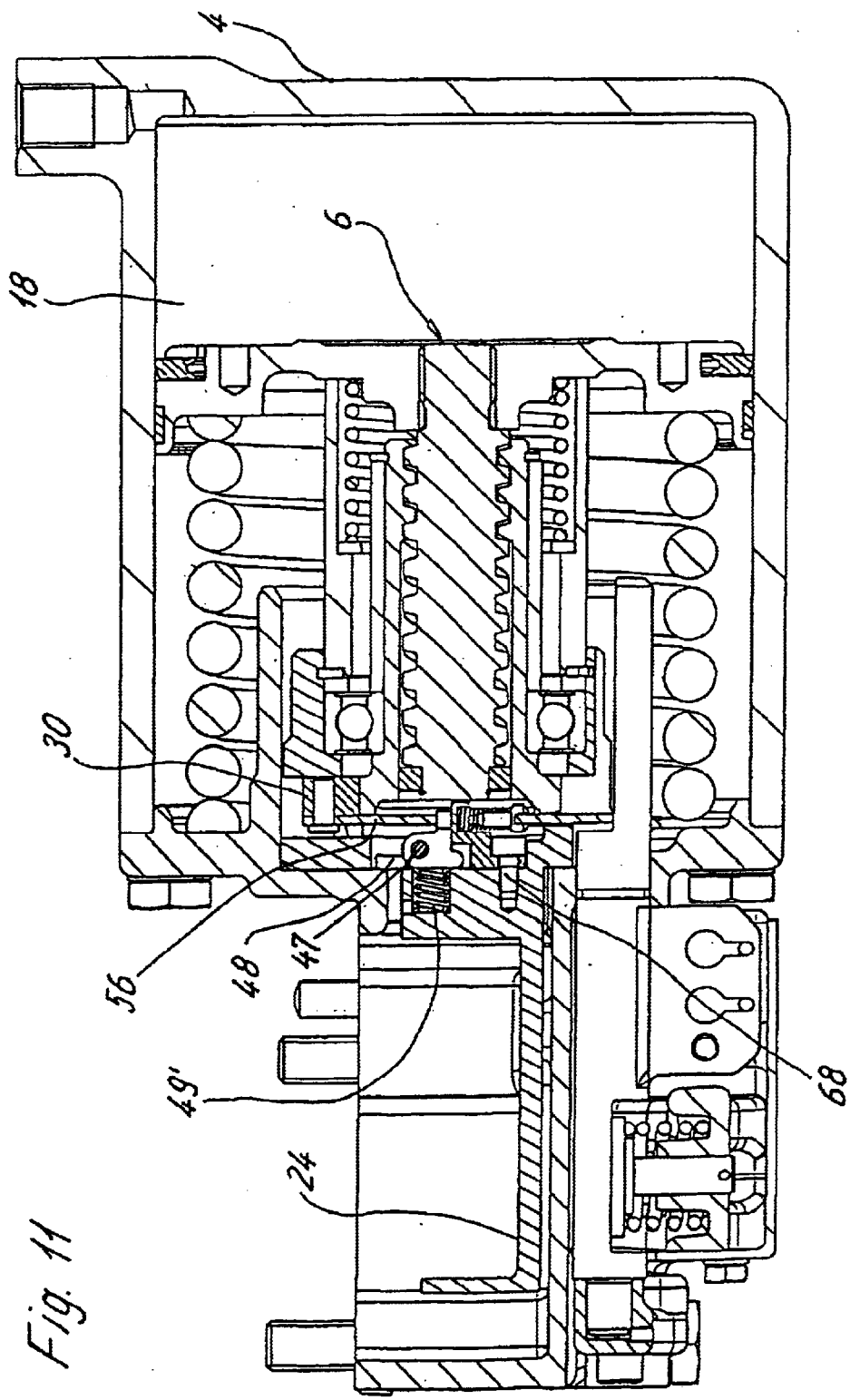
FIG. 11 shows another embodiment similar to that of FIG. 8 with a modified lock and bar arrangement.

As an alternative, a locking bar operation is conceivable between the piston rod 24 and the spring-loaded housing 4. Such an embodiment is illustrated in FIG. 11. The basic construction of this embodiment is similar to the embodiment of FIGS. 8 to 10 with respect to the coupling of the spring-loaded piston 6. However, the locking bar 48 is constructed such that it impacts during the moving of the piston rod 24 from the spring-loaded housing 4 and, during a continued movement, is rotated about an axis 47. This rotating movement and a reverse rotating movement by the spring 49 between the piston rod 6 and the locking bar 48 move the locking bar 48 into its two operating positions and, in this manner, move it into and out of the recess 64 of the holding plate 56.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed is:

1. A spring brake cylinder with an emergency release device comprising:

a housing, in which a spring-loaded piston is axially displaceable and a piston rod;

at least one spring-loaded spring acting on the piston;

the emergency release device including an operating device and an emergency release mechanism for interrupting the transmission of force between the spring-loaded piston and the piston rod, the emergency release mechanism having a holding device for holding the emergency release device in a transmission condition, the holding device having different positions;

a blocking device for preventing the holding device from holding the emergency release mechanism in a transmission position while the spring-loaded piston is only partially released; and the blocking device having a locking bar which locks the holding device in a released position of the holding device until the spring-loaded piston is completely released.

2. The spring brake cylinder according to claim 1, wherein the holding device is designed to be one of rotating, linear, and clamping and to permit several positions.

3. The spring brake cylinder according to claim 1, wherein the holding device has a detent pawl acting upon a gear wheel.

4. The spring brake cylinder according to claim 3, including at least one spring in the transmission of force of the emergency release device for avoiding intermediate conditions of the detent pawl.

5. The spring brake cylinder according to claim 3, wherein the detent pawl is on a holding plate which is radially displaceable in the cylinder housing such that radial displacement of the holding plate and of the detent pawl releases or blocks the gear wheel.

6. The spring brake cylinder according to claim 5, wherein the locking bar is on the piston rod and is designed, in an operating position, to engage a recess of the holding plate and radially lock the holding plate.

7. The spring brake cylinder according to claim 5, wherein the locking bar is swivellably disposed on the piston rod such that, during axial movements of the piston rod, the locking bar swivels from the cylinder housing into and out of a recess of the holding plate.

8. The spring brake cylinder according to claim 3, wherein the transmission of force between the spring-loaded piston and the piston rod includes a threaded spindle.

9. The spring brake cylinder according to claim 8, wherein the torque of the threaded spindle is transmitted by a displaceable guide with an adjusting spring to the gear wheel which can be locked by the detent pawl.

10. The spring brake cylinder according to claim 3, wherein the operating unit has a driving device for driving the detent pawl, a Bowden cable and at least one restoring spring and a pressure spring on the Bowden cable.

11. The spring brake cylinder according to claim 3, wherein the transmission of force between the spring-loaded piston and the piston rod includes a free running device for the gear wheel.

12. The spring brake cylinder according to claim 11, wherein the free running device is constructed as a cone clutch.

13. The spring brake cylinder according to claim 3, wherein the locking bar can be displaced by the spring-loaded piston from its locking position in the detent pawl.

14. The spring brake cylinder according to claim 3, wherein the detent pawl and the locking bar are on the piston rod.

15. The spring brake cylinder according to claim 1, wherein the locking bar is arranged in one of:

between the housing and the spring-loaded piston,
between the piston rod and the spring-loaded piston, and
between the piston rod and the housing.

16. The spring brake cylinder according to claim 1, wherein the force of the spring-loaded spring is supported either by the spring-loaded piston on the pressure space or by the piston rod on the spring-loaded piston.

17. The spring brake cylinder according to claim 1, wherein the locking bar is operated by a threaded spindle connected with the spring-loaded piston.

18. The spring brake cylinder according to claim 1, including a display device for displaying the operating condition of the emergency release device.

19. The spring brake cylinder according to claim 1, wherein the locking bar is essentially bolt-shaped and, at its end facing a housing cover section, is equipped with a locking bar head which is designed for engaging in a recess of a detent pawl of the holding device.

20. The spring brake cylinder according to claim 1, wherein a locking bar spring is arranged between a housing cover and the locking bar, which locking bar spring presses the locking bar in the direction of a detent pawl of the holding device.

* * * * *